US008057873B2

(12) United States Patent
Levasalmi

(10) Patent No.: US 8,057,873 B2
(45) Date of Patent: Nov. 15, 2011

(54) INJECTION MOLDED ARTICLE AND METHOD FOR THE MANUFACTURE THEREOF

(75) Inventor: Juha-Matti Levasalmi, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 517 days.

(21) Appl. No.: 12/267,060

(22) Filed: Nov. 7, 2008

(65) Prior Publication Data

US 2009/0269659 A1    Oct. 29, 2009

Related U.S. Application Data

(60) Provisional application No. 61/048,301, filed on Apr. 28, 2008.

(51) Int. Cl.
*B32B 23/00* (2006.01)
*B32B 1/08* (2006.01)

(52) U.S. Cl. ............ 428/35.7; 428/34.1; 428/34.2; 428/35.9; 428/36.9

(58) Field of Classification Search ............ 428/34.1, 428/34.2, 35.7, 35.9, 36.9
See application file for complete search history.

(56) References Cited

U.S. PATENT DOCUMENTS

| | | | |
|---|---|---|---|
| 3,383,435 A | 5/1968 | Cizek | |
| 3,952,072 A | 4/1976 | Yonemitsu et al. | |
| 4,681,906 A | 7/1987 | Abolins et al. | |
| 4,900,786 A | 2/1990 | Abolins et al. | |
| 5,294,655 A | 3/1994 | Lee, Jr. et al. | |
| 5,397,822 A | 3/1995 | Lee, Jr. | |
| 5,576,387 A | 11/1996 | Chambers | |
| 6,197,869 B1 * | 3/2001 | Weber et al. | 524/495 |
| 6,201,067 B1 | 3/2001 | Cheung et al. | |
| 6,258,879 B1 * | 7/2001 | Adedeji et al. | 524/127 |
| 6,350,514 B1 | 2/2002 | Venderbosch | |
| 6,462,167 B1 | 10/2002 | Nodera et al. | |
| 7,358,293 B2 | 4/2008 | Agarwal | |
| 7,519,927 B1 * | 4/2009 | Hryckowian et al. | 716/100 |
| 2002/0137824 A1 | 9/2002 | Hong et al. | |
| 2003/0125430 A1 | 7/2003 | Adedeji et al. | |
| 2004/0209968 A1 * | 10/2004 | Bastiaens et al. | 521/82 |
| 2005/0127579 A1 * | 6/2005 | Suzuki | 264/572 |
| 2005/0154100 A1 | 7/2005 | Kosaka et al. | |
| 2005/0171266 A1 | 8/2005 | Matthijssen et al. | |
| 2006/0058432 A1 | 3/2006 | Perego et al. | |
| 2007/0060677 A1 | 3/2007 | Yoshida et al. | |
| 2007/0100070 A1 | 5/2007 | Todt et al. | |
| 2007/0138702 A9 | 6/2007 | Matthijssen et al. | |
| 2007/0249766 A1 | 10/2007 | Ishii et al. | |

FOREIGN PATENT DOCUMENTS

| | | |
|---|---|---|
| EP | 747436 A2 | 12/1996 |
| EP | 0885929 A1 | 12/1998 |
| WO | 2005/097897 A1 | 10/2005 |

OTHER PUBLICATIONS

The International Searching Authority, International Search Report, PCT/US2009/061144, International Filing Date Oct. 19, 2009, Mailing date: May 27, 2010, 9 pages.
The International Searching Authority, Written Opinion, PCT/US2009/061144, International Filing Date Oct. 19, 2009, Mailing Date May 27, 2010 (5 pages).
ASTM D3835, Standard Test Method for Determination of Properties of Polymeric Materials by Means of a Capillary Rheometer.
ISO 1133, Plastics—Determination of the melt mass-flow rate (MFR) and the melt volume-flow rate (MVR) of thermoplastics.
ISO178, Plastics—Determination of flexural properties.
ASTM D648, Standard Test Method for Deflection Temperature of Plastics Under Flexural Load in the Edgewise Position.
UL 94, Tests for Flammability of Plastic Materials for Parts in Devices and Appliances.
ISO 180, Plastics—Determination of Izod impact strength.
D.H. Morton-Jones, "Polymer Processing", New York: Chapman & Hall, 1989, p. 35.
The International Searching Authority, International Search Report, PCT/US2009/038161, Mailing Date: Nov. 10, 2009, 7 pages.
The International Searching Authority, Written Opinion, PCT/US2009/038161, Mailing Date: Nov. 10, 2009, 4 pages.
ASTM D 3763-06, Standard Test Method for High Speed Puncture Properties of Plastics Using Load and Displacement Sensors, Downloaded Feb. 23, 2007, 9 pages.

* cited by examiner

*Primary Examiner* — Marc Patterson
(74) *Attorney, Agent, or Firm* — Cantor Colburn LLP

(57) ABSTRACT

Injection molded articles having large, thin sections are prepared by injection molding of a composition that includes specific amounts of poly(arylene ether) and a rubber-modified polystyrene. The specific component amounts provide the composition with a shear thinning index of 6 to 17 measured at a temperature of 260 to 300° C. and shear rates of 100 and 10,000 second$^{-1}$.

42 Claims, No Drawings

INJECTION MOLDED ARTICLE AND METHOD FOR THE MANUFACTURE THEREOF

CROSS REFERENCE TO RELATED APPLICATION

This application claims the benefit of U.S. Provisional Patent Application Ser. No. 61/048,301 filed Apr. 28, 2008, which is fully incorporated herein by reference.

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Injection molding compositions including a poly(arylene ether), a rubber-modified polystyrene, and a flame retardant are commonly used to mold a variety of articles. The melt rheology properties needed for injection molding these compositions are generally known. However, the present inventor has observed that injection molding compositions exhibiting similar melt rheology properties can exhibit different molding characteristics when used to mold articles having large, thin sections. For example, some molding compositions exhibit much larger mold shrinkages and/or warping than others. There is therefore a need to identify previously unrecognized melt rheology property limitations that improve the molding of large, thin objects from poly(arylene ether) compositions. This is also a need to identify poly(arylene ether) compositions that satisfy the previously unrecognized melt rheology property limitations.

BRIEF DESCRIPTION OF THE INVENTION

The above-described and other drawbacks are alleviated by an injection molded article, wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate that is a liquid at one atmosphere and at least one temperature in the range 25 to 50° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835.

Another embodiment is a method of injection molding, comprising: injection molding an injection molding composition to form an injection molded article; wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate that is a liquid at one atmosphere and at least one temperature in the range 25 to 50° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835.

These and other embodiments are described in detail below.

DETAILED DESCRIPTION OF THE INVENTION

The present inventor has discovered that the ratio of melt viscosity at a shear rate of 100 second$^{-1}$ to melt viscosity at a shear rate of 10,000 second$^{-1}$ is a previously unrecognized result-effective variable for predicting the ability to mold large, flat parts with poly(arylene ether) injection molding composition. The ratio of melt viscosities at two different shear rates is known as a shear thinning ratio. The importance of the melt viscosity at a shear rate of 100 second$^{-1}$ in the shear thinning ratio is surprising given conventional wisdom in the art that melt viscosities at shear rates below 1,000 second$^{-1}$ are not important for injection molding. For example, one monograph discloses shear rate ranges associated with various processes and specifically discloses a shear rate range of 1,000 to 100,000 second$^{-1}$ for injection molding. D. H. Morton-Jones in "Polymer Processing" (1994), page 35, Table 2.3. However, the present inventor, in the course of trying to solve a problem encountered by an injection molder, discovered that improved molding of large flat parts was obtained when the ratio of melt viscosity at a shear rate of 100 second$^{-1}$ to melt viscosity at a shear rate of 10,000 second$^{-1}$ is in the range 6 to 17 for the molding temperature range of 260 to 300° C.

Thus, one embodiment is an injection molded article, wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate flame retardant, wherein the triaryl phosphate flame retardant is a liquid at 25° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835.

The specified shear thinning index of 6 to 17 is for a temperature range of 260 to 300° C., and the particular shear thinning index range will depend on the specific molding temperature employed. For a given melt temperature, this shear thinning index is calculated as the ratio of the melt viscosity at a shear rate of 100 second$^{-1}$ to the melt viscosity at a shear rate of 10,000 second$^{-1}$. As an illustration using data from Table 3 below, at a melt temperature of 260° C. the melt viscosity at a shear rate of 100 second$^{-1}$ is 841 Pascal-seconds, the melt viscosity at a shear rate of 10,000 second$^{-1}$ is 64.2 Pascal-seconds, and the shear thinning index is 841/64.2=13.1.

In some embodiments, when measured as a temperature of 260° C., the shear thinning index at shear rates of 100 and 10,000 second$^{-1}$ is 12 to 17, specifically 13 to 16, more specifically 13 to 15. In some embodiments, when measured at a temperature of 280° C., the shear thinning index at shear rates of 100 and 10,000 second$^{-1}$ is 10 to 14, specifically 11 to 13. In some embodiments, when measured at a temperature of 300° C., the shear thinning index at shear rates of 100 and 10,000 second$^{-1}$ is 6 to 12, specifically 7 to 11, more specifically 8 to 10.

In some embodiments, the injection molding composition exhibits a viscosity less than 1000 Pascal-seconds measured at 260° C. and a shear rate of 100 second$^{-1}$ according to ASTM D3835 and/or a viscosity less than 600 Pascal-seconds measured at 280° C. and a shear rate of 100 second$^{-1}$ according to ASTM D3835, and/or a viscosity less than 400 Pascal-seconds measured at 300° C. and a shear rate of 100 second$^{-1}$ according to ASTM D3835. In some embodiments, the injection molding composition exhibits a melt viscosity of 200 to 1000 Pascal-seconds, specifically 400 to 1000 Pascal-seconds measured at a temperature of 260 to 300° C. and a shear rate of 100 second$^{-1}$ according to ASTM D3835. At 260° C., the melt viscosity at a shear rate of 100 second$^{-1}$ can be 600 to 900 Pascal seconds. At 280° C., the melt viscosity at a shear rate of 100 second$^{-1}$ can be 400 to 600 Pascal seconds. And at 300° C., the melt viscosity at a shear rate of 100 second$^{-1}$ can be 200 to 400 Pascal seconds.

As mentioned above, the above shear thinning index limitations are particularly critical when injection molding article having large, thin sections. Such articles are characterized as comprising a portion having a first dimension of at least 10 centimeters, a second dimension of at least 10 centimeters, and a third dimension of less than 1 centimeter. Thus, the first and second dimensions define the "large" characteristic of the section, and the third dimension defines the "thin" characteristic of the section. In some embodiments, the first dimension is 10 to 100 centimeters, the second dimension is 10 to 100 centimeters, and the third dimension is 0.02 to 1 centimeter. In some embodiments, the first dimension is 30 to 100 centimeters, the second dimension is 30 to 100 centimeters, and the third dimension is 0.1 to 0.5 centimeter.

In some embodiments, the first and second dimensions define a plane. For example, the molded article can be a battery case having an overall rectangular prism shape in which at least one wall is a (planar) rectangle.

The injection molding composition comprises a poly(arylene ether). Suitable poly(arylene ether)s include those comprising repeating structural units having the formula

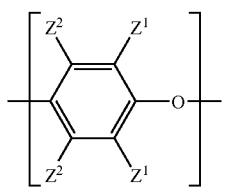

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) has an intrinsic viscosity of 0.3 to 0.55 deciliter per gram measured at 25° C. in chloroform. Specifically, the poly(arylene ether) intrinsic viscosity may be 0.35 to 0.5 deciliter per gram, more specifically 0.35 to 0.45 deciliter per gram.

The injection molding composition comprises 30 to 60 weight percent of the poly(arylene ether), based on the total weight of the injection molding composition. Within this range, the poly(arylene ether) amount can be 40 to 60 weight percent, more specifically 45 to 60 weight percent, still more specifically 50 to 60 weight percent, yet more specifically 50 to 55 weight percent.

In addition to the poly(arylene ether), the injection molding composition comprises a rubber-modified polystyrene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene. In some embodiments, the rubber-modified polystyrene has an effective gel content of 10 to 35 percent. Suitable rubber-modified polystyrenes are commercially available as, for example, GEH 1897 from SABIC Innovative Plastics, and D7022.27 from Chevron.

The injection molding composition comprises 20 to 60 weight percent of the rubber-modified polystyrene, based on the total weight of the injection molding composition. Within this range, the rubber-modified polystyrene amount can be 20 to 50 weight percent, more specifically 20 to 40 weight percent, even more specifically 20 to 30 weight percent.

In addition to the poly(arylene ether) and the rubber-modified polystyrene, the injection molding composition comprises a triaryl phosphate that is a liquid at one atmosphere and at least one temperature in the range 25 to 50° C. Triaryl phosphates that are liquids at one atmosphere and at least one temperature in the range 25 to 50° C. include, for example, resorcinol bis(diphenyl phosphate), resorcinol bis(di-2,6-dimethylphenyl phosphate), bisphenol A bis(diphenyl phosphate), resorcinol bis(di-2,6-dimethylphenyl phosphate), alkylated triphenyl phosphates (such as methylated triphenyl phosphates and butylated triphenyl phosphates), and the like, and mixtures thereof. The injection molding composition comprises the triaryl phosphate in an amount of 10 to 20 weight percent, specifically 15 to 20 weight percent, based on the total weight of the injection molding composition.

The injection molding composition can, optionally, further comprise an unhydrogenated block copolymer of an alkenyl aromatic compound and a conjugated diene. The alkenyl aromatic compound can be, for example, styrene, methyl styrene, t-butyl styrene, or the like. The conjugated diene can be, for example, butadiene, isoprene, or the like. Suitable unhydrogenated block copolymers include, for example, poly(styrene-b-butadiene) diblock copolymers and poly(styrene-b-butadiene-b-styrene) triblock copolymers. When present, the unhydrogenated block copolymer is used in an amount of 0.5 to 5 weight percent, specifically 1 to 4 weight percent, more specifically 1 to 3 weight percent, based on the total weight of the injection molding composition.

The injection molding composition comprises 10 to 20 weight percent of the triaryl phosphate, based on the total weight of the injection molding composition. Within this range, the rubber-modified polystyrene amount can be 12 to 18 weight percent, more specifically 13 to 17 weight percent.

The injection molding composition may, optionally, further comprise various additives known in the thermoplastics art. For example, the injection molding composition may, optionally, further comprise an additive chosen from stabilizers, antioxidants, mold release agents, processing aids, drip retardants, nucleating agents, UV blockers, dyes, pigments, fragrances, anti-static agents, mineral oil, metal deactivators, antiblocking agents, nanoclays, and the like, and combinations thereof.

In some embodiments, the injection molding composition excludes any component not described above as required or optional. For example, in some embodiments, the injection molding composition excludes any polymer other than the poly(arylene ether), the rubber-modified polystyrene, and the optional unhydrogenated block copolymer, provided that the injection molding composition can comprise up to 2 weight percent of a polymeric mold release agent and/or up to 0.5 weight percent of a fluoropolymer-containing additive such as, for example, the polytetrafluoroethylene grafted and/or coated with poly(styrene-acrylonitrile), which is commonly referred to by the acronym TSAN. In some embodiments, the injection molding composition excludes fillers. In some embodiments, the injection molding composition excludes polyamides, polyesters, polyolefin homopolymers, poly(alkenyl aromatic) homopolymers, poly(phenylene sulfide)s, and hydrogenated block copolymers of an alkenyl aromatic and a conjugated diene.

The injection molding composition exhibits excellent melt properties. For example, in some embodiments the injection molding composition exhibits a melt volume flow rate of 40 to 70 cubic centimeters per 10 minutes, measured at 280° C. with a 5 kilogram load according to ISO 1133. Within this range, the melt flow volume rate can be 50 to 65 cubic centimeters per 10 minutes, more specifically 55 to 60 cubic centimeters per 10 minutes.

The injection molding composition imparts exhibits excellent physical properties to articles molded from it. For example, in some embodiments, the injection molding composition exhibits a heat distortion temperature of 81 to 100° C., measured at 1.82 megapascals according to ISO 178. Within this range, the heat distortion temperature can be 85 to 100° C., more specifically 90 to 100° C. As another example, in some embodiments, the injection molding composition exhibits a flexural modulus of at least 2500 megapascals, measured at 23° C. according to ISO 178. Specifically, the flexural modulus can be 2500 to 3000 megapascals, more specifically 2600 to 2900 megapascals. As another example, in some embodiments, the injection molding composition exhibits a notched Izod impact strength of at least 50 joules/meter$^2$ measured at 23° C. according to ISO 180, specifically 50 to 200 joules/meter$^2$, more specifically 80 to 180 joules/meter$^2$.

In some embodiments, the injection molded article exhibits a mold shrinkage of less than or equal to 0.7 percent, measured at 23° C. according to the procedure described below in the working examples. Specifically, the mold shrinkage can be 0.4 to 0.7 percent.

A variety of injection molded articles can be molded from the injection molding composition. These include battery cases, such as cases for lead acid batteries, doors, television frames, lap top covers, tool cases, automotive parts, and the like.

The injection molded articles are recyclable. Thus, the injection molding composition can comprise at least 5 weight percent of recycled content based on the total weight of the injection molding composition. Specifically, the recycled content can be 5 to 50 weight percent, more specifically 10 to 40 weight percent, still more specifically 10 to 30 weight percent, even more specifically 10 to 20 weight percent. The recycled content can include material that has been recycled 1 to 10 times. An injection molded article prepared with recycled content will typically property values that are at least 85% of the corresponding values for an article molded from virgin resin.

A particularly advantageous example of recycling is the recycling of lead acid battery cases molded from the injection molding composition. In this case, either the recycled content or the injection molding composition as a whole can include 0.1 to 2 weight percent of lead (as elemental lead). Within this range, the lead content can be 0.2 to 1.3 weight percent, more specifically 0.4 to 0.8 weight percent. Recycling lead acid battery cases reduces the quantity of waste lead entering the environment.

In a specific embodiment, the injection molded article is a battery case comprising at least one essentially planar section having a first dimension of 30 to 100 centimeters, a second dimension of 30 to 100 centimeters, and a third dimension of 0.1 to 0.5 centimeter; wherein the injection molding composition comprises 45 to 55 weight percent of a poly(2,6-dimethyl-1,4-phenylene ether) having an intrinsic viscosity of 0.3 to 0.43 deciliter/gram measured at 25° C. in chloroform, 25 to 31 weight percent of a rubber-modified polystyrene, and 12 to 20 weight percent of a triaryl phosphate flame retardant; and wherein the injection molding composition exhibits a shear thinning index of 12 to 17 measured at shear rates of 100 and 10,000 second$^{-1}$ at a temperature of 260° C. according to ASTM D3835 a viscosity of 600 to 1000 Pascal-seconds measured at a temperature of 260° C. and a shear rate of 100 second$^{-1}$ according to ASTM D3835, a melt volume flow rate of 30 to 60 cubic centimeters per 10 minutes measured at 280° C. with a 5 kilogram load according to ISO 1133, a heat distortion temperature of 81 to 100° C., measured at 1.82 megapascals according to ASTM D648, and a mold shrinkage of 0.4 to 0.7 percent, measured at 23° C. In some embodiments, the injection molding composition further exhibits a UL 94 Vertical Burning Test rating of V-0 or V-1, measured at a sample thickness (that is, at least one sample thickness) in the range of 1.5 to 3 millimeters.

Another embodiment is a method of injection molding, comprising: injection molding an injection molding composition to form an injection molded article; wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate flame retardant, wherein the triaryl phosphate flame retardant is a liquid at 25° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835. Typical injection molding conditions include using a barrel temperature of 260 to 300° C. and a mold temperature of 50 to 90° C.

In a specific embodiment of the injection molding method, the injection molded article is a battery case comprising at least one essentially planar section having a first dimension of 30 to 100 centimeters, a second dimension of 30 to 100 centimeters, and a third dimension of 0.1 to 0.5 centimeter; wherein the injection molding composition comprises 45 to 55 weight percent of a poly(2,6-dimethyl-1,4-phenylene ether) having an intrinsic viscosity of 0.3 to 0.43 deciliter/gram measured at 25° C. in chloroform, 25 to 31 weight percent of a rubber-modified polystyrene, and 12 to 20 weight percent of a triaryl phosphate flame retardant; and wherein the injection molding composition exhibits a shear thinning index of 12 to 17 measured at shear rates of 100 and 10,000 second$^{-1}$ at a temperature of 260° C. according to ASTM D3835 a viscosity of 600 to 1000 Pascal-seconds measured at a temperature of 260° C. and a shear rate of 100 seconds$^{-1}$ according to ASTM D3835, a melt volume flow rate of 30 to 60 cubic centimeters per 10 minutes measured at 280° C. with a 5 kilogram load according to ISO 1133, a heat distortion temperature of 81 to 100° C., measured at 1.82 megapascals according to ASTM D648, and a mold shrinkage of 0.4 to 0.7 percent, measured at 23° C.; wherein said injection molding comprises using a barrel temperature of 260 to 300° C. and a mold temperature of 50 to 90° C.

In some embodiments, the injection molding composition comprises at least 1 weight percent of recycled content. In some embodiments, the injection molding composition comprises 5 to 50 weight percent, specifically 10 to 40 weight percent, more specifically 10 to 30 weight percent, even more specifically 10 to 20 weight percent of recycled content. In some embodiments, the recycled content can comprise 0.1 to 2 weight percent lead based on the weight of the recycled content. Within this range, the lead content can be 0.2 to 1.3 weight percent, specifically 0.4 to 0.8 weight percent. In some embodiments, the injection molding composition as a whole can comprise 0.1 to 2 weight percent lead based on the total weight of the injection molding composition. Within this range, the lead content can be 0.2 to 1.3 weight percent, specifically 0.4 to 0.8 weight percent.

One embodiment is an injection molded article prepared by the above-described method.

The invention includes at least the following embodiments.

Embodiment 1

An injection molded article, wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate that is a liquid at one atmosphere and at least one temperature in the range 25 to 50° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835.

Embodiment 2

The injection molded article of embodiment 1, wherein the shear thinning index at 260° C. is 12 to 17.

Embodiment 3

The injection molded article of embodiment 1 or 2, wherein the shear thinning index at 280° C. is 10 to 14.

Embodiment 4

The injection molded article of any of embodiments 1-3, wherein the shear thinning index at 300° C. is 6 to 12.

Embodiment 5

The injection molded article of any of embodiments 1-4, wherein the first dimension is 10 to 100 centimeters, the second dimension is 10 to 100 centimeters, and the third dimension is 0.02 to 1 centimeter.

Embodiment 6

The injection molded article of any of embodiments 1-5, wherein the first dimension is 30 to 100 centimeters, the second dimension is 30 to 100 centimeters, and the third dimension is 0.1 to 0.5 centimeter.

Embodiment 7

The injection molded article of any of embodiments 1-6, wherein the first and second dimensions define a plane.

Embodiment 8

The injection molded article of any of embodiments 1-7, wherein the injection molding composition exhibits a viscosity less than 1000 Pascal-seconds measured at 260° C. and a shear rate of 100 second$^{-1}$ according to ASTM D3835.

Embodiment 9

The injection molded article of any of embodiments 1-8, wherein the injection molding composition exhibits a viscosity less than 600 Pascal-seconds measured at 280° C. and a shear rate of 100 second$^{-1}$ according to ASTM D3835.

Embodiment 10

The injection molded article of any of embodiments 1-9, wherein the injection molding composition exhibits a viscosity less than 400 Pascal-seconds measured at 300° C. and a shear rate of 100 second$^{-1}$ according to ASTM D3835.

Embodiment 11

The injection molded article of any of embodiments 1-10, wherein the injection molding composition exhibits a viscosity of 200 to 1000 Pascal-seconds measured at a temperature of 260 to 300° C. and a shear rate of 100 second$^{-1}$ according to ASTM D3835.

Embodiment 12

The injection molded article of any of embodiments 1-11, wherein the injection molding composition exhibits a melt volume flow rate of 40 to 70 cubic centimeters per 10 minutes, measured at 280° C. with a 5 kilogram load according to ISO 1133.

Embodiment 13

The injection molded article of any of embodiments 1-12, wherein the injection molding composition exhibits a heat distortion temperature of 81 to 100° C., measured at 1.82 megapascals according to ASTM D648.

Embodiment 14

The injection molded article of any of embodiments 1-13, wherein the injection molding composition exhibits a flexural modulus of at least 2500 megapascals, measured at 23° C. according to ISO 178.

Embodiment 15

The injection molded article of any of embodiments 1-14, wherein the injection molding composition exhibits a flexural modulus of 2500 to 3000 megapascals, measured at 23° C. according to ISO 178.

Embodiment 16

The injection molded article of any of embodiments 1-15, wherein the injection molding composition exhibits a notched Izod impact strength of at least 50 joules/meter$^2$ measured at 23° C. according to ISO 180.

Embodiment 17

The injection molded article of any of embodiments 1-16, wherein the injection molding composition exhibits a notched Izod impact strength of 50 to 200 joules/meter$^2$ measured at 23° C. according to ISO 180.

Embodiment 18

The injection molded article of any of embodiments 1-17, wherein the injection molded article exhibits a mold shrinkage of less than or equal to 0.7 percent, measured at 23° C.

Embodiment 19

The injection molded article of any of embodiments 1-18, wherein the injection molded article exhibits a mold shrinkage of 0.4 to 0.7 percent, measured at 23° C.

Embodiment 20

The injection molded article of any of embodiments 1-19, wherein the rubber-modified polystyrene comprises 88 to 94 weight percent polystyrene and 6 to 12 weight percent polybutadiene.

Embodiment 21

The injection molded article of any of embodiments 1-20, wherein the triaryl phosphate is resorcinol bis(diphenyl phosphate), bisphenol A bis(diphenyl phosphate), or a mixture thereof.

Embodiment 22

The injection molded article of any of embodiments 1-21, wherein the injection molding composition further comprises 0.5 to 5 weight percent of a polystyrene-polybutadiene-polystyrene triblock copolymer.

Embodiment 23

The injection molded article of any of embodiments 1-22, wherein the injection molding composition further comprises an additive selected from the group consisting of stabilizers, antioxidants, mold release agents, processing aids, drip retardants, colorants, fragrances, and mixtures thereof.

Embodiment 24

The injection molded article of any of embodiments 1-23, wherein the injection molding composition excludes polyamides, polyesters, polyolefin homopolymers, poly(alkenyl aromatic) homopolymers, poly(phenylene sulfide)s, and hydrogenated block copolymers of an alkenyl aromatic and a conjugated diene.

Embodiment 25

The injection molded article of any of embodiments 1-24, wherein the injection molding composition excludes any polymer other than the poly(arylene ether), the rubber-modified polystyrene, and a polystyrene-polybutadiene-polystyrene triblock copolymer, provided that the injection molding composition can comprise up to 2 weight percent of a polymeric mold release agent and/or up to 0.5 weight percent of a fluoropolymer-containing additive.

Embodiment 26

The injection molded article of any of embodiments 1-25, wherein the injection molded article is a battery case.

Embodiment 27

The injection molded article of any of embodiments 1-26, wherein the injection molding composition comprises at least 5 weight percent of recycled content.

Embodiment 28

The injection molded article of any of embodiments 1-27, wherein the injection molding composition comprises 5 to 50 weight percent of recycled content.

Embodiment 29

The injection molded article of embodiment 28, wherein the recycled content comprises material that has been recycled 1 to 10 times.

Embodiment 30

The injection molded article of any of embodiments 1-29, wherein the injection molded article is a battery case; and wherein the recycled content comprises 0.1 to 2 weight percent lead based on the weight of the recycled content.

Embodiment 31

The injection molded article of any of embodiments 1-29, wherein the injection molded article is a battery case; and wherein the injection molding composition comprises 0.1 to 2 weight percent lead based on the total weight of the injection molding composition.

Embodiment 32

The injection molded article of embodiment 1, wherein the injection molded article is a battery case comprising at least one essentially planar section having a first dimension of 30 to 100 centimeters, a second dimension of 30 to 100 centimeters, and a third dimension of 0.1 to 0.5 centimeter; wherein the injection molding composition comprises 45 to 55 weight percent of the poly(arylene ether); wherein the poly(arylene ether) comprises a poly(2,6-dimethyl-1,4-phenylene ether) having an intrinsic viscosity of 0.3 to 0.43 deciliter/gram measured at 25° C. in chloroform, 25 to 31 weight percent of the rubber-modified polystyrene, and 12 to 20 weight percent of the triaryl phosphate flame retardant; and wherein the injection molding composition exhibits a shear thinning index of 12 to 17 measured at shear rates of 100 and 10,000 second$^{-1}$ at a temperature of 260° C. according to ASTM D3835 a viscosity of 600 to 1000 Pascal-seconds measured at a temperature of 260° C. and a shear rate of 100 second$^{-1}$ according to ASTM D3835, a melt volume flow rate of 30 to 60 cubic centimeters per 10 minutes measured at 280° C. with a 5 kilogram load according to ISO 1133, a heat distortion temperature of 81 to 100° C., measured at 1.82 megapascals according to ASTM D648, and a mold shrinkage of 0.4 to 0.7 percent, measured at 23° C.

Embodiment 33

The injection molded article of embodiment 32, wherein the injection molding composition further exhibits a UL 94 Vertical Burning Test rating of V-0 or V-1, measured at a sample thickness in the range of 1.5 to 3 millimeters.

Embodiment 44

A method of injection molding, comprising: injection molding an injection molding composition to form an injection molded article; wherein a portion of the injection molded article comprises a first dimension of at least 10 centimeters, a second dimension of at least 10 centimeters, and a third dimension of less than 1 centimeter; wherein the injection molded article is a product of injection molding an injection molding composition comprising 30 to 60 weight percent of a poly(arylene ether) having an intrinsic viscosity of 0.3 to 0.55 deciliter/gram measured at 25° C. in chloroform, 20 to 60 weight percent of a rubber-modified polystyrene, and 10 to 20 weight percent of a triaryl phosphate that is a liquid at one atmosphere and at least one temperature in the range 25 to 50° C.; wherein all weight percents are based on the total weight of the injection molding composition; and wherein the injection molding composition has a shear thinning index of 6 to 17 measured at shear rates of 100 and 10,000 second$^{-1}$ at a temperature of 260 to 300° C. according to ASTM D3835.

Embodiment 35

The method of injection molding of embodiment 34, wherein said injection molding comprises using a barrel temperature of 260 to 300° C. and a mold temperature of 50 to 90° C.

Embodiment 36

The method of injection molding of embodiment 34, wherein the injection molded article is a battery case comprising at least one essentially planar section having a first dimension of 30 to 100 centimeters, a second dimension of 30 to 100 centimeters, and a third dimension of 0.1 to 0.5 centimeter; wherein the injection molding composition comprises 45 to 55 weight percent of the poly(arylene ether); therein the poly(arylene ether) comprises a poly(2,6-dimethyl-1,4-phenylene ether) having an intrinsic viscosity of 0.3 to 0.43 deciliter/gram measured at 25° C. in chloroform, 25 to 31 weight percent of the rubber-modified polystyrene, and 12 to 20 weight percent of the triaryl phosphate flame retardant; and wherein the injection molding composition exhibits a shear thinning index of 12 to 17 measured at shear rates of 100 and 10,000 second$^{-1}$ at a temperature of 260° C. according to ASTM D3835 a viscosity of 600 to 1000 Pascal-seconds measured at a temperature of 260° C. and a shear rate of 100 second$^{-1}$ according to ASTM D3835, a melt volume flow rate of 30 to 60 cubic centimeters per 10 minutes measured at 280° C. with a 5 kilogram load according to ISO 1133, a heat distortion temperature of 81 to 100° C., measured at 1.82 megapascals according to ASTM D648, and a mold shrinkage of 0.4 to 0.7 percent, measured at 23° C.; wherein said injection molding comprises using a barrel temperature of 260 to 300° C. and a mold temperature of 50 to 90° C.

Embodiment 37

The method of injection molding of any of embodiments 34-36, wherein the injection molding composition comprises at least 1 weight percent of recycled content.

Embodiment 38

The method of injection molding of any of embodiments 34-36, wherein the injection molding composition comprises 5 to 50 weight percent of recycled content.

Embodiment 39

The method of injection molding of embodiment 38, wherein the recycled content comprises 0.1 to 2 weight percent lead based on the weight of the recycled content.

Embodiment 40

The method of injection molding of any of embodiments 36-38, wherein the injection molding composition comprises 0.1 to 2 weight percent lead based on the total weight of the injection molding composition.

Embodiment 41

An injection molded article prepared by the method of any of embodiments 34-40.

The invention is further illustrated by the following non-limiting examples.

Examples 1-4, Comparative Example 1

These examples illustrate the relationships between molding composition, rheological properties, and physical properties of resulting molded articles.

The injection molding compositions were prepared from the materials listed in Table 1.

TABLE 1

| | |
|---|---|
| PPE 0.4 IV | Poly(2,6-dimethyl-1,4-phenylene ether) having an intrinsic viscosity of 0.4 deciliters per gram measured in chloroform at 25° C., obtained as PPO 640 from SABIC Innovative Plastics |
| PPE 0.3 IV | Poly(2,6-dimethyl-1,4-phenylene ether) having an intrinsic viscosity of 0.3 deciliters per gram measured in chloroform at 25° C., obtained as PPO 630 from SABIC Innovative Plastics |
| PPE 0.46 IV | Poly(2,6-dimethyl-1,4-phenylene ether) having an intrinsic viscosity of 0.46 deciliters per gram measured in chloroform at 25° C., obtained as PPO 646 from SABIC Innovative Plastics |
| ZnS | Zinc sulfide, >96%, obtained as Sachtolith HD from Sachtleben |
| ZnO | Zinc oxide having a surface area of 4-6 meter$^2$/g, obtained as Zinc Oxide CR-4 from GH Chemical, or as Zincweiss Harzsiegel CF from Norzinco |
| SBS | Polystyrene-polybutadiene-polystyrene triblock copolymer having a styrene content of 31 weight percent, a Shore A hardness of 69, and a solution viscosity of 4000 centipoise at 25% in toluene; obtained as Kraton D1101-12 from Kraton Polymers, or as Vector 2518 from Dexco Polymers |
| TSAN | Polytetrafluoroethylene encapsulated in poly(styrene-acrylonitrile), having a polyacrylonitrile content of 8-12 weight percent and a polytetrafluoroethylene content of 47-53 weight percent; obtained as 44449-1000 from SABIC Innovative Plastics |
| LLDPE | Linear low-density polyethylene having a density of 0.922-0.928 grams per milliliter and a melt flow rate of 20 grams/10 minutes measured at 190° C. and 2.16 kilogram load; obtained as Escorene LL-5100.09 from ExxonMobil or Novapol GM-2024A from Nova Polymers |
| TDP | Tridecylphosphite, obtained as Weston TDP from Chemtura |
| HIPS | Rubber-modified polystyrene having 88-94 weight percent polystyrene and 6-12 weight percent polybutadiene, and having an effective gel content of 10-35%; obtained as GEH 1897 from SABIC Innovative Plastics or as D7022.27 from Chevron |
| TiO$_2$ | Titanium dioxide, having tint values in the range of −0.40 to 0.35 for CIE delta B, less than 0.60 for CIE delta E, and −0.35 to 0.50 for CIE delta L, obtained as Kronos 2450 from Kronos |
| Carbon black | Carbon black, having 200 parts per million by weight residue maximum on a 325 mesh screen, obtained as Monarch 800 from Cabot |
| Solvent Green 3 | Solvent Green 3 (CAS Reg. No. 128-80-3), obtained as Green 5B from Farbtex |
| Red 101 | Pigment Red 101 (CAS Reg. No. 1309-37-1), obtained as Bayferrox 180 MPL from Lanxess |
| Yellow 53 | Pigment Yellow 53 (CAS Reg. No. 8007-18-9), obtained as Sicotan Yellow 1010 from BASF |
| Clay | Kaolin clay, having a BET surface area of 21 meter$^2$/gram and a median particle size of 0.4 micrometer, obtained as Polyfil HG-90 from JM Huber |
| RDP | Resorcinol bis(diphenyl phosphate), obtained as Fyrolflex RDP from Supresta or as Reofos RDP from Chemtura |
| BPADP | Bisphenol A bis(diphenyl phosphate), obtained as BPA-DP from Chemtura |

The compositions of all examples were extrusion compounded using the component amounts shown in Table 2, where all component amounts are expressed in parts by weight. The extrusion compounding was conducted in a 53-millimeter internal diameter, ten zone, twin-screw extruder operating at a screw rotation rate of 280 rotations per minute and using zone temperatures of 200-245-260-260-260-260-260-260-260-260° C. from feed throat to die. The extrudate was cooled and chopped into pellets.

Melt volume flow rate (MVR) values, expressed in units of centimeter$^3$/10 minutes (cm$^3$/10 min), were determined at 280° C. using a 5 kilogram load in accordance with ASTM D1238-04.

Melt viscosity values, expressed in units of pascal-seconds (Pa-sec), were determined using a Kayeness Capillary viscometer at 260, 280, and 300° C. and shear rates of 100 to 10,000 second$^{-1}$ in accordance with ASTM D3835-02 using a capillary length:diameter ratio of 20:1, a capillary diameter of 1.0 millimeter, a capillary entrance angle of 180 degrees, and a dwell time of 4 minutes. Shear thinning index ("STI") was calculated as the ratio of the melt viscosity at a shear rate at 100 second$^{-1}$ to the melt viscosity at a shear rate of 10,000 second$^{-1}$.

shear rate at 10,000 second$^{-1}$. Melt viscosity values as a function of shear rate and temperature, and shear thinning index values as a function of temperature, are presented in Table 3.

Test samples for physical property testing were injection molded using a barrel temperature of 260° C., a mold temperature of 55° C., a pressure of 4.83 megapascals (700 pounds per square inch), and an injection speed of 5.08 centimeters/second (2 inches/second).

Flexural modulus values, expressed in units of megapascals (MPa), were determined in accordance with ISO 178 (2001). The test bars had dimensions 80 millimeters×10 millimeters×4 millimeters. The flexural modulus values presented in Table 2 were calculated as the average of test results for five test bars.

Flexural Stress values, expressed in units of megapascals (MPa), were determined at 5% strain in accordance with ISO 178 (2001).

Heat deformation temperature (HDT) values, expressed in units of degrees centigrade (° C.), were determined on 3.2 millimeter bars per ASTM D648-07 at a load of 1.82 MPa.

Notched Izod Impact strength (NII) values, expressed in units of joules/meter$^2$ (J/m$^2$), were determined at 23° C. on 3.2 mm bars in accordance with ISO 180 (2000).

Mold shrinkage values, expressed in units of percent, were determined by molding a standard "Dynatup" disk (see ASTM D3763-06) and measuring the actual part diameter in the flow and cross-flow directions. In the molding procedure, molten resin enters one edge of the disk-shaped mold and flows to the opposite edge, filling the mold as it goes. The reported mold shrinkage values are the average of mold shrinkage in the flow and cross-flow directions, where $$\text{mold shrinkage in flow direction} = \frac{(\text{mold\_diameter} - \text{flow\_diameter})}{\text{mold\_diameter}} 100$$

and $$\text{mold shrinkage in cross-flow direction} = \frac{(\text{mold\_diameter} - \text{cross\_flow\_diameter})}{\text{mold\_diameter}} 100$$

wherein mold_diameter is the disk diameter of the mold, flow_diameter is the diameter of the molded disk in the direction of resin flow, and cross_flow_diameter is the diameter of the molded disk perpendicular to the direction of resin flow.

Referring to the property values in Tables 2 and 3, the injection molding compositions of Examples 1 to 4 provided articles with surprisingly low mold shrinkage values of 0.48 to 0.66 percent. These observed mold shrinkage values were unexpectedly lower than the mold shrinkage value of 0.74 percent for Comparative Example 1. The Example 1-4 compositions were also superior in their heat distortion temperatures, exhibiting values of 81 to 98° C., compared to a value of 80° C. for Comparative Example 1. The Example 1-4 compositions also exhibited reduced shear thinning index values relative to Comparative Example 1. Specifically Examples 1-4 exhibited shear thinning index values ranging from 12.5 to 14.8, whereas Comparative Example 1 exhibited a shear thinning index value of 17.9. While not wishing to be bound by any particular theory, the present inventor believes that the shear thinning index values calculated from viscosity values of 100 to 10,000 seconds$^{-1}$ are predictive of the ability to mold large, thin objects such as battery cases. This is surprising, given that the melt viscosities at shear rates of 1,000 to 10,000 seconds$^{-1}$ were thought to be important for injection molding. Thus, the shear thinning index calculated based on viscosity values of 100 to 10,000 seconds$^{-1}$ appears to be a previously unrecognized result-effective variable for the molding of large, thin objects from poly(arylene ether) compositions.

TABLE 2

| | Ex. 1 | Ex. 2 | Ex. 3 | Ex. 4 | C. Ex 1 |
|---|---|---|---|---|---|
| COMPOSITIONS | | | | | |
| PPE 0.4 IV | 49.62 | — | 53.72 | — | — |
| PPE 0.3 IV | — | 49.81 | — | 52.32 | — |
| PPE 0.46 IV | — | — | — | — | 49.62 |
| ZnS | 0.12 | 0.12 | 0.12 | 0.12 | — |
| ZnO | 0.12 | 0.12 | 0.12 | 0.12 | — |
| SBS | 2.41 | 2.41 | 1.58 | 1.54 | 2.41 |
| TSAN | 0.11 | 0.25 | 0.24 | 0.34 | — |
| LLDPE | 1.21 | 1.21 | 0.96 | 0.96 | — |
| TDP | 0.40 | 0.40 | 0.39 | 0.38 | — |
| HIPS | 28.04 | 27.63 | 24.56 | 23.45 | 28.04 |
| TiO$_2$ | 1.16 | 1.14 | 1.16 | 1.16 | — |
| Carbon Black | 0.06 | 0.06 | 0.06 | 0.06 | — |
| Solvent Green 3 | 0.02 | 0.02 | 0.02 | 0.02 | — |
| Red 101 | 0.02 | 0.02 | 0.02 | 0.02 | — |
| Yellow 53 | 0.32 | 0.32 | 0.32 | 0.32 | — |
| Clay | — | — | — | 2.46 | — |
| RDP | 16.41 | — | — | — | 16.41 |
| BPADP | — | 16.49 | 16.73 | 16.73 | — |
| PROPERTIES | | | | | |
| MVR (cm$^3$/10 min) | 42 | 59 | 39 | 48 | 30 |
| Flexural Modulus (MPa) | 2650 | 2860 | 2700 | 2780 | 2590 |
| Flex Stress (MPa) | 95 | 106 | 103 | 102 | 93 |
| HDT (° C.) | 81 | 86 | 98 | 92 | 80 |
| Notched Izod (J/m$^2$) | 180 | 99 | 109 | 83 | 260 |
| Mold shrinkage (%) | 0.57 | 0.48 | 0.62 | 0.66 | 0.74 |

TABLE 3

|  | Ex. 1 | | | Ex. 2 | | | Ex. 3 | | | Ex. 4 | | | C. Ex 1 | | |
| --- | --- | --- | --- | --- | --- | --- | --- | --- | --- | --- | --- | --- | --- | --- | --- |
|  | 260° C. | 280° C. | 300° C. | 260° C. | 280° C. | 300° C. | 260° C. | 280° C. | 300° C. | 260° C. | 280° C. | 300° C. | 260° C. | 280° C. | 300° C. |
| 100 sec$^{-1}$ | 841 | 499 | 306 | 670 | 386 | 209 | 1033 | 531 | 296 | 851 | 462 | 268 | 1010 | 654 | 436 |
| 500 sec$^{-1}$ | 346 | 245 | 165 | 313 | 205 | 126 | 401 | 273 | 166 | 376 | 238 | 152 | 399 | 285 | 207 |
| 1000 sec$^{-1}$ | 235 | 171 | 119 | 217 | 146 | 95 | 269 | 191 | 121 | 254 | 168 | 113 | 261 | 191 | 143 |
| 1500 sec$^{-1}$ | 187 | 136 | 96 | 173 | 118 | 80 | 214 | 153 | 99 | 199 | 135 | 93 | 202 | 150 | 114 |
| 3000 sec$^{-1}$ | 127 | 89 | 65 | 115 | 80 | 57 | 145 | 101 | 69 | 129 | 91 | 66 | 128 | 97.5 | 75 |
| 5000 sec$^{-1}$ | 95 | 64 | 48 | 84 | 58 | 44 | 109 | 72 | 51 | 93 | 66 | 50 | 91 | 70 | 54 |
| 10000 sec$^{-1}$ | 64.2 | 39.6 | 30 | 53.8 | 36.7 | 29.5 | 74.1 | 44.4 | 33 | 57.6 | 41.4 | 33.1 | 56.3 | 43.6 | 33.9 |
| STI | 13.1 | 12.6 | 10.2 | 12.5 | 10.5 | 7.1 | 13.9 | 12.0 | 9.0 | 14.8 | 11.2 | 8.1 | 17.9 | 15.0 | 12.9 |

Example 5, Comparative Examples 2 and 3

These examples illustrate that the injection molding composition is scalable.

In this set of example, the injection molding compositions were prepared by extrusion compounding using a 203-millimeter internal diameter Baker-Perkins twin-screw extruder with a length to internal diameter (L/D) ratio of 15.5:1. A typical screw rotation rate was 275 rotations per minute. Six-zone temperature control was applied with a common temperature profile of 204-260-260-260-260-288° C. (400-500-500-500-500-550° F.) from feed throat to die. The screw design for extrusion compounding was such that metering and melting zones were followed concurrently by mixing and pumping zones. Representative production rates ranged from 1400 to 2300 kilograms per hour (3000 to 5000 pounds per hour). The resulting extrudate was cooled and chopped into pellets.

The compositions and flammability properties are summarized in Table 4. Note that the composition of Example 5 is identical to that of Example 3 above, and the composition of Comparative Example 2 is identical to that of Comparative Example 1 above. UL94 ratings were determined according to UL 94, "Test for Flammability of Plastic Materials for Parts in Devices and Appliances", Fifth Edition (1996), Vertical Burning Test, using a sample thickness of 3 millimeters.

Results of viscosity measurements are presented in Table 5. Each melt viscosity value represents the average of measurements of eight samples.

TABLE 4

|  | Ex. 5 | C. Ex 2 | C. Ex. 3 |
| --- | --- | --- | --- |
| COMPOSITIONS | | | |
| PPE 0.4 IV | 53.72 | — | — |
| PPE 0.3 IV | — | 49.62 | — |
| PPE 0.46 IV | — | — | 55.02 |

TABLE 4-continued

|  | Ex. 5 | C. Ex 2 | C. Ex. 3 |
| --- | --- | --- | --- |
| ZnS | 0.12 | — | — |
| ZnO | 0.12 | — | — |
| SBS | 1.58 | 2.41 | 1.62 |
| TSAN | 0.24 | — | — |
| LLDPE | 0.96 | — | — |
| TDP | 0.39 | — | — |
| HIPS | 24.56 | 28.04 | 25.88 |
| TiO$_2$ | 1.16 | — | — |
| Carbon Black | 0.06 | — | — |
| Solvent Green 3 | 0.02 | — | — |
| Red 101 | 0.02 | — | — |
| Yellow 53 | 0.32 | — | — |
| Clay | — | — | — |
| RDP | — | 16.41 | 13.41 |
| BPADP | 16.73 | — | — |
| PROPERTIES | | | |
| UL94 Vertical Burn Rating, at 3 mm | V-0 | V-0 | V-0 |

TABLE 5

|  | Ex. 5 | | | C. Ex 2 | | | C. Ex. 3 | | |
| --- | --- | --- | --- | --- | --- | --- | --- | --- | --- |
|  | 260° C. | 280° C. | 300° C. | 260° C. | 280° C. | 300° C. | 260° C. | 280° C. | 300° C. |
| 100 sec$^{-1}$ | 949 | 585 | 321 | 926 | 642 | 422 | 1555 | 1001 | 659 |
| 500 sec$^{-1}$ | 428 | 274 | 178 | 403 | 282 | 205 | 585 | 412 | 299 |
| 1000 sec$^{-1}$ | 287 | 190 | 130 | 266 | 191 | 141 | 375 | 270 | 203 |
| 1500 sec$^{-1}$ | 224 | 151 | 106 | 205 | 150 | 111 | 287 | 208 | 159 |
| 3000 sec$^{-1}$ | 143 | 101 | 73 | 129 | 97 | 72 | 180 | 131 | 103 |
| 5000 sec$^{-1}$ | 100 | 74 | 54 | 89 | 70 | 51 | 127 | 91 | 73 |
| 10000 sec$^{-1}$ | 60 | 47 | 35 | 53 | 44 | 31 | 78 | 55 | 45 |
| STI | 15.8 | 12.4 | 9.2 | 17.5 | 14.6 | 13.6 | 19.9 | 18.2 | 14.6 |

This written description uses examples to disclose the exemplary embodiments, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An injection molded article,
   wherein a portion of the injection molded article comprises
      a first dimension of at least 10 centimeters,
      a second dimension of at least 10 centimeters, and
      a third dimension of less than 1 centimeter;
   wherein the injection molded article is a product of injection molding an injection molding composition comprising
      30 to 60 weight percent of a poly(arylene ether) having an intrinsic viscosity of 0.3 to 0.55 deciliter/gram measured at 25° C. in chloroform,
      20 to 60 weight percent of a rubber-modified polystyrene, and
      10 to 20 weight percent of a triaryl phosphate that is a liquid at one atmosphere and at least one temperature in the range 25 to 50° C.;
      wherein all weight percents are based on the total weight of the injection molding composition; and
   wherein the injection molding composition has a shear thinning index of 6 to 17 measured at shear rates of 100 and 10,000 second$^{-1}$ at a temperature of 260 to 300° C. according to ASTM D3835.

2. The injection molded article of claim 1, wherein the shear thinning index at 260° C. is 12 to 17.

3. The injection molded article of claim 1, wherein the shear thinning index at 280° C. is 10 to 14.

4. The injection molded article of claim 1, wherein the shear thinning index at 300° C. is 6 to 12.

5. The injection molded article of claim 1, wherein the first dimension is 10 to 100 centimeters, the second dimension is 10 to 100 centimeters, and the third dimension is 0.02 to 1 centimeter.

6. The injection molded article of claim 1, wherein the first dimension is 30 to 100 centimeters, the second dimension is 30 to 100 centimeters, and the third dimension is 0.1 to 0.5 centimeter.

7. The injection molded article of claim 1, wherein the first and second dimensions define a plane.

8. The injection molded article of claim 1, wherein the injection molding composition exhibits a viscosity less than 1000 Pascal-seconds measured at 260° C. and a shear rate of 100 second$^{-1}$ according to ASTM D3835.

9. The injection molded article of claim 1, wherein the injection molding composition exhibits a viscosity less than 600 Pascal-seconds measured at 280° C. and a shear rate of 100 second$^{-1}$ according to ASTM D3835.

10. The injection molded article of claim 1, wherein the injection molding composition exhibits a viscosity less than 400 Pascal-seconds measured at 300° C. and a shear rate of 100 second$^{-1}$ according to ASTM D3835.

11. The injection molded article of claim 1, wherein the injection molding composition exhibits a viscosity of 200 to 1000 Pascal-seconds measured at a temperature of 260 to 300° C. and a shear rate of 100 second$^{-1}$ according to ASTM D3835.

12. The injection molded article of claim 1, wherein the injection molding composition exhibits a melt volume flow rate of 40 to 70 cubic centimeters per 10 minutes, measured at 280° C. with a 5 kilogram load according to ISO 1133.

13. The injection molded article of claim 1, wherein the injection molding composition exhibits a heat distortion temperature of 81 to 100° C., measured at 1.82 megapascals according to ASTM D648.

14. The injection molded article of claim 1, wherein the injection molding composition exhibits a flexural modulus of at least 2500 megapascals, measured at 23° C. according to ISO 178.

15. The injection molded article of claim 1, wherein the injection molding composition exhibits a flexural modulus of 2500 to 3000 megapascals, measured at 23° C. according to ISO 178.

16. The injection molded article of claim 1, wherein the injection molding composition exhibits a notched Izod impact strength of at least 50 joules/meter$^2$ measured at 23° C. according to ISO 180.

17. The injection molded article of claim 1, wherein the injection molding composition exhibits a notched Izod impact strength of 50 to 200 joules/meter$^2$ measured at 23° C. according to ISO 180.

18. The injection molded article of claim 1, wherein the injection molded article exhibits a mold shrinkage of less than or equal to 0.7 percent, measured at 23° C.

19. The injection molded article of claim 1, wherein the injection molded article exhibits a mold shrinkage of 0.4 to 0.7 percent, measured at 23° C.

20. The injection molded article of claim 1, wherein the rubber-modified polystyrene comprises 88 to 94 weight percent polystyrene and 6 to 12 weight percent polybutadiene.

21. The injection molded article of claim 1, wherein the triaryl phosphate is resorcinol bis(diphenyl phosphate), bisphenol A bis(diphenyl phosphate), or a mixture thereof.

22. The injection molded article of claim 1, wherein the injection molding composition further comprises 0.5 to 5 weight percent of a polystyrene-polybutadiene-polystyrene triblock copolymer.

23. The injection molded article of claim 1, wherein the injection molding composition further comprises an additive selected from the group consisting of stabilizers, antioxidants, mold release agents, processing aids, drip retardants, colorants, fragrances, and mixtures thereof.

24. The injection molded article of claim 1, wherein the injection molding composition excludes polyamides, polyesters, polyolefin homopolymers, poly(alkenyl aromatic) homopolymers, poly(phenylene sulfide)s, and hydrogenated block copolymers of an alkenyl aromatic and a conjugated diene.

25. The injection molded article of claim 1, wherein the injection molding composition excludes any polymer other than the poly(arylene ether), the rubber-modified polystyrene, and a polystyrene-polybutadiene-polystyrene triblock copolymer, provided that the injection molding composition can comprise up to 2 weight percent of a polymeric mold release agent and/or up to 0.5 weight percent of a fluoropolymer-containing additive.

26. The injection molded article of claim 1, wherein the injection molded article is a battery case.

27. The injection molded article of claim 1, wherein the injection molding composition comprises at least 5 weight percent of recycled content.

28. The injection molded article of claim 1, wherein the injection molding composition comprises 5 to 50 weight percent of recycled content.

29. The injection molded article of claim 28, wherein the recycled content comprises material that has been recycled 1 to 10 times.

30. The injection molded article of claim 1, wherein the injection molded article is a battery case; and wherein the recycled content comprises 0.1 to 2 weight percent lead based on the weight of the recycled content.

31. The injection molded article of claim 1, wherein the injection molded article is a battery case; and wherein the injection molding composition comprises 0.1 to 2 weight percent lead based on the total weight of the injection molding composition.

32. The injection molded article of claim 1,
wherein the injection molded article is a battery case comprising at least one
essentially planar section having
a first dimension of 30 to 100 centimeters,
a second dimension of 30 to 100 centimeters, and
a third dimension of 0.1 to 0.5 centimeter;
wherein the injection molding composition comprises
45 to 55 weight percent of the poly(arylene ether); wherein the poly(arylene ether) comprises a poly(2,6-dimethyl-1,4-phenylene ether) having an intrinsic viscosity of 0.3 to 0.43 deciliter/gram measured at 25° C. in chloroform,
25 to 31 weight percent of the rubber-modified polystyrene, and
12 to 20 weight percent of the triaryl phosphate flame retardant; and
wherein the injection molding composition exhibits
a shear thinning index of 12 to 17 measured at shear rates of 100 and 10,000 second$^{-1}$ at a temperature of 260° C. according to ASTM D3835
a viscosity of 600 to 1000 Pascal-seconds measured at a temperature of 260° C. and a shear rate of 100 second$^{-1}$ according to ASTM D3835,
a melt volume flow rate of 30 to 60 cubic centimeters per 10 minutes measured at 280° C. with a 5 kilogram load according to ISO 1133,
a heat distortion temperature of 81 to 100° C., measured at 1.82 megapascals according to ASTM D648, and
a mold shrinkage of 0.4 to 0.7 percent, measured at 23° C.

33. The injection molded article of claim 32, wherein the injection molding composition further exhibits a UL 94 Vertical Burning Test rating of V-0 or V-1, measured at a sample thickness in the range of 1.5 to 3 millimeters.

34. A method of injection molding, comprising:
injection molding an injection molding composition to form an injection molded article;
wherein a portion of the injection molded article comprises
a first dimension of at least 10 centimeters,
a second dimension of at least 10 centimeters, and
a third dimension of less than 1 centimeter;
wherein the injection molded article is a product of injection molding an injection molding composition comprising
30 to 60 weight percent of a poly(arylene ether) having an intrinsic viscosity of 0.3 to 0.55 deciliter/gram measured at 25° C. in chloroform,
20 to 60 weight percent of a rubber-modified polystyrene, and
10 to 20 weight percent of a triaryl phosphate that is a liquid at one atmosphere and at least one temperature in the range 25 to 50° C.;
wherein all weight percents are based on the total weight of the injection molding composition; and
wherein the injection molding composition has a shear thinning index of 6 to 17 measured at shear rates of 100 and 10,000 second$^{-1}$ at a temperature of 260 to 300° C. according to ASTM D3835.

35. The method of injection molding of claim 34, wherein said injection molding comprises using a barrel temperature of 260 to 300° C. and a mold temperature of 50 to 90° C.

36. The method of injection molding of claim 34,
wherein the injection molded article is a battery case comprising at least one essentially planar section having
a first dimension of 30 to 100 centimeters,
a second dimension of 30 to 100 centimeters, and
a third dimension of 0.1 to 0.5 centimeter;
wherein the injection molding composition comprises
45 to 55 weight percent of the poly(arylene ether); therein the poly(arylene ether) comprises a poly(2,6-dimethyl-1,4-phenylene ether) having an intrinsic viscosity of 0.3 to 0.43 deciliter/gram measured at 25° C. in chloroform,
25 to 31 weight percent of the rubber-modified polystyrene, and
12 to 20 weight percent of the triaryl phosphate flame retardant; and
wherein the injection molding composition exhibits
a shear thinning index of 12 to 17 measured at shear rates of 100 and 10,000 second$^{-1}$ at a temperature of 260° C. according to ASTM D3835
a viscosity of 600 to 1000 Pascal-seconds measured at a temperature of 260° C. and a shear rate of 100 second$^{-1}$ according to ASTM D3835,
a melt volume flow rate of 30 to 60 cubic centimeters per 10 minutes measured at 280° C. with a 5 kilogram load according to ISO 1133,
a heat distortion temperature of 81 to 100° C., measured at 1.82 megapascals according to ASTM D648, and
a mold shrinkage of 0.4 to 0.7 percent, measured at 23° C.;
wherein said injection molding comprises using a barrel temperature of 260 to 300° C. and a mold temperature of 50 to 90° C.

37. The method of injection molding of claim 34, wherein the injection molding composition comprises at least 1 weight percent of recycled content.

38. The method of injection molding of claim 34, wherein the injection molding composition comprises 5 to 50 weight percent of recycled content.

39. The method of injection molding of claim 38, wherein the recycled content comprises 0.1 to 2 weight percent lead based on the weight of the recycled content.

40. The method of injection molding of claim 36, wherein the injection molding composition comprises 0.1 to 2 weight percent lead based on the total weight of the injection molding composition.

41. An injection molded article prepared by the method of claim 34.

42. The injection molded article of claim 1,
wherein the injection molded article is a battery case comprising at least one essentially planar section having
a first dimension of 30 to 100 centimeters,
a second dimension of 30 to 100 centimeters, and
a third dimension of 0.1 to 0.5 centimeter;

wherein the injection molding composition comprises
49.6 to 53.7 weight percent of the poly(arylene ether); wherein the poly(arylene ether) comprises a poly(2,6-dimethyl-1,4-phenylene ether) having an intrinsic viscosity of 0.3 to 0.4 deciliter/gram measured at 25° C. in chloroform,
23.4 to 28 weight percent of the rubber-modified polystyrene, and
16.4 to 16.7 weight percent of the triaryl phosphate flame retardant;
wherein the injection molding composition exhibits
a shear thinning index of 12.5 to 15.8 measured at shear rates of 100 and 10,000 second$^{-1}$ at a temperature of 260° C. according to ASTM D3835,
a viscosity of 670 to 1033 Pascal-seconds measured at a temperature of 260° C. and a shear rate of 100 second$^{-1}$ according to ASTM D3835,
a melt volume flow rate of 39 to 59 cubic centimeters per 10 minutes measured at 280° C. with a 5 kilogram load according to ISO 1133,
a heat distortion temperature of 81 to 98° C., measured at 1.82 megapascals according to ASTM D648, and
a mold shrinkage of 0.48 to 0.66 percent, measured at 23° C.

* * * * *